Aug. 2, 1966    G. M. GASKILL ETAL    3,263,739
AUTOMOTIVE COMFORT CONTROL SYSTEM
Filed Nov. 8, 1963    5 Sheets-Sheet 1

INVENTORS
George M. Gaskill,
William H. Kolbe,
BY Thomas A. Prewitt, &
Edward W. Yott
George E. Johnson
ATTORNEY Aug. 2, 1966 G. M. GASKILL ETAL 3,263,739
AUTOMOTIVE COMFORT CONTROL SYSTEM
Filed Nov. 8, 1963 5 Sheets-Sheet 2
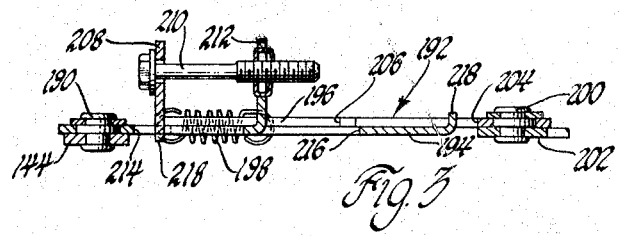
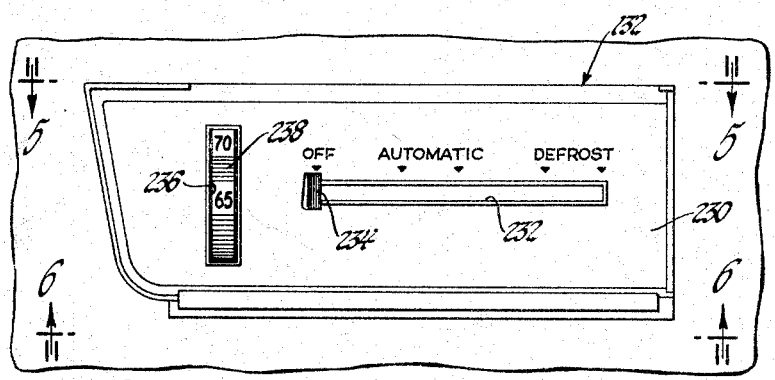
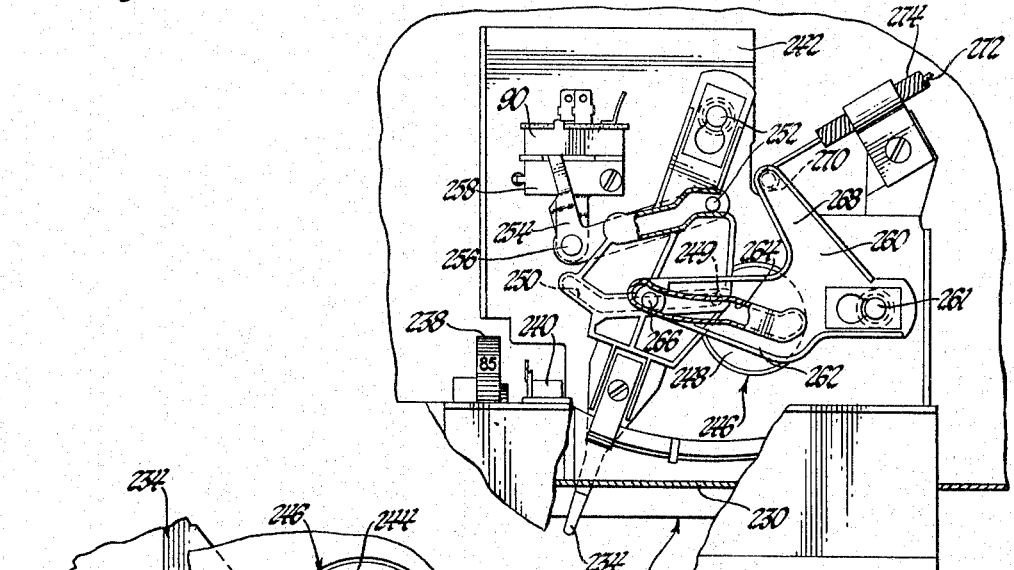
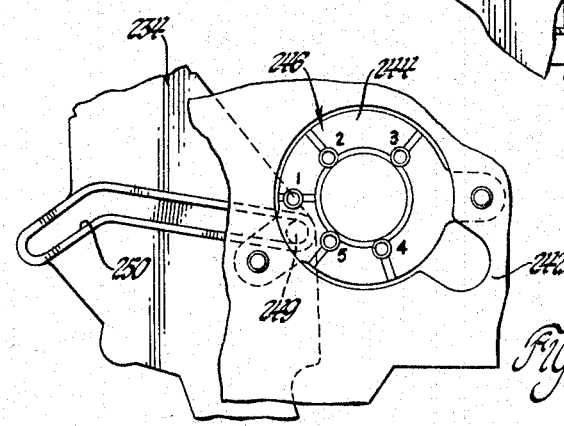
INVENTORS
George M. Gaskill,
William H. Kolbe,
BY Thomas A. Prewitt, &
Edward W. Yott
George E. Johnson
ATTORNEY United States Patent Office 3,263,739
Patented August 2, 1966

3,263,739
AUTOMOTIVE COMFORT CONTROL SYSTEM
George M. Gaskill and Thomas A. Prewitt, Kokomo, Ind., and William H. Kolbe, Birmingham, and Edward W. Yott, St. Clair Shores, Mich., assignors to General Motors Corporation, Detroit, Mich., a corporation of Delaware
Filed Nov. 8, 1963, Ser. No. 322,491
12 Claims. (Cl. 165—23)

This invention relates to comfort control systems and more particularly to heating, ventilating and air conditioning systems specifically adapted for use in automotive vehicles under all weather conditions.

The system described hereinafter as an embodiment of the present invention is adapted automatically to control passenger compartment temperature and to maintain a selected temperature despite wide fluctuations in ambient conditions. Heretofore, it has been common to admit heated air and cooler air in such proportions with the help of an air-mix damper that the mixture of such air would suitably determine the passenger compartment temperature. It has been found, however, that mere positioning of the air-mix damper is not sufficient to gain an adequate control. Many other variables must also be dealt with if the operator of a vehicle is to rely on a system actually capable of contributing automatic control at all times and in any weather. Such variables include temperature and humidity of the heated air, temperature of the cooled air, blower speed, temperature in the car, need for windshield defrosting, engine coolant temperature, air outlet selection (cooled or heated air), and time to activate the system (hold until engine is warm for heating). It is also desirable that a manual instrument panel control unit with a minimum of manually operable elements or knobs be provided in order that adjustments may simply and conveniently be made despite the many variables to be anticipated and to suit individual requirements.

An object of the present invention is to provide an improved automotive comfort control system by means of which required conditions in a passenger compartment may automatically be maintained despite wide fluctuations in ambient conditions.

To this end, a feature of the present invention is an air-mix damper in a system of air admission ducts for proportioning heated air and cooler air, this damper being linked to a power assembly arranged to operate the damper as well as other system components, and the power assembly being in combination with a dash control assembly permitting manual adjustment of system programming as automatically determined by vacuum operation of the power assembly in response to condition sensors.

These and other important features of the invention will now be described in detail in the specification and then pointed out more particularly in the appended claims.

In the drawings:

FIGURE 3 is a sectional view taken along the line 3—3 of FIGURE 2 better to illustrate a lost motion connection or linkage;

FIGURE 4 is an elevation view drawn to an enlarged scale, of a dash control assembly having only two controls presented for the operator's use;

FIGURE 5 is a view of the dash control unit assembly as viewed in the direction of the arrows 5—5 of FIGURE 4 with parts broken away better to illustrate the construction;

FIGURE 6 is a view looking in the direction of the arrows 6—6 in FIGURE 4 showing details of the construction;

Figure 9:
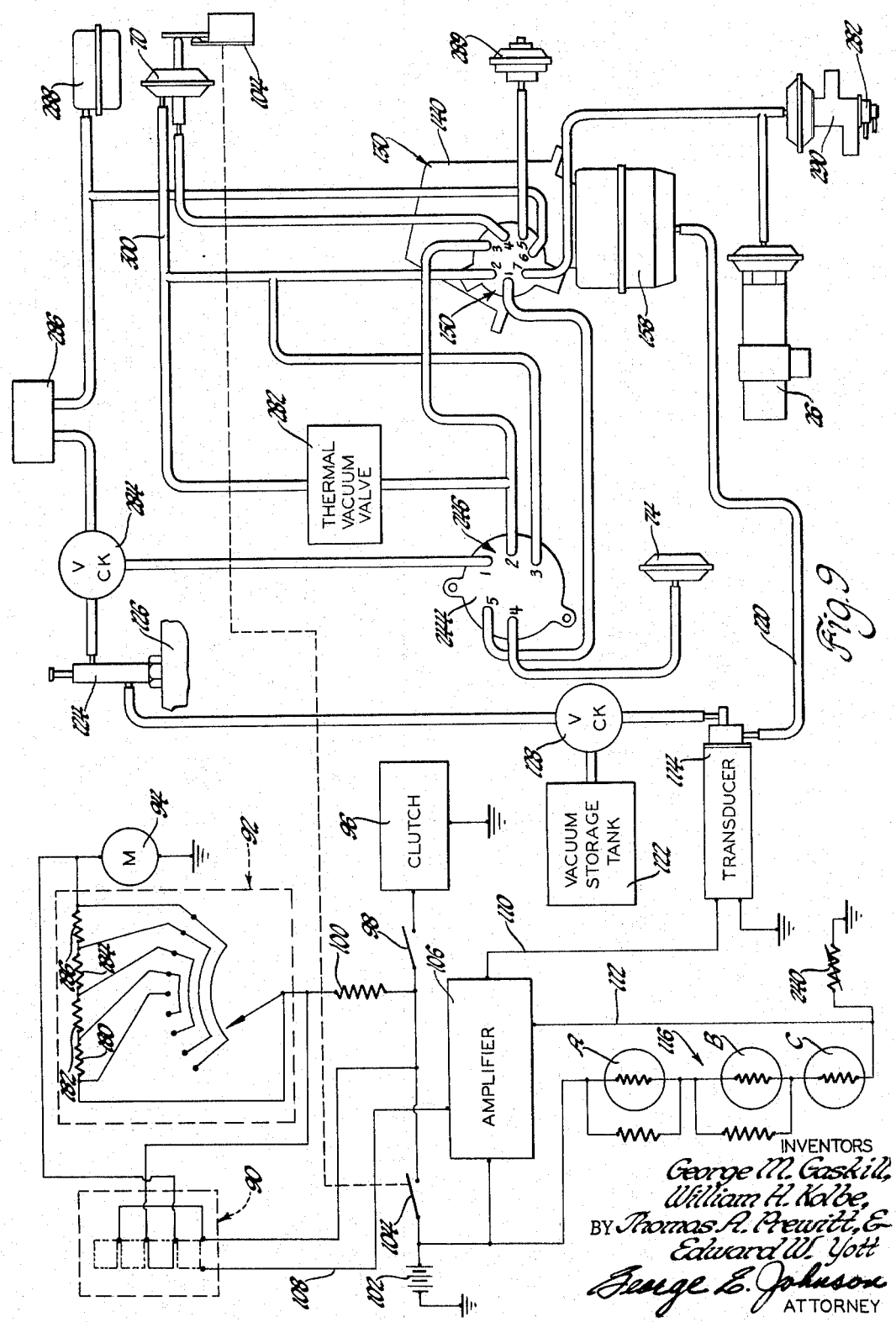
Figure 10:
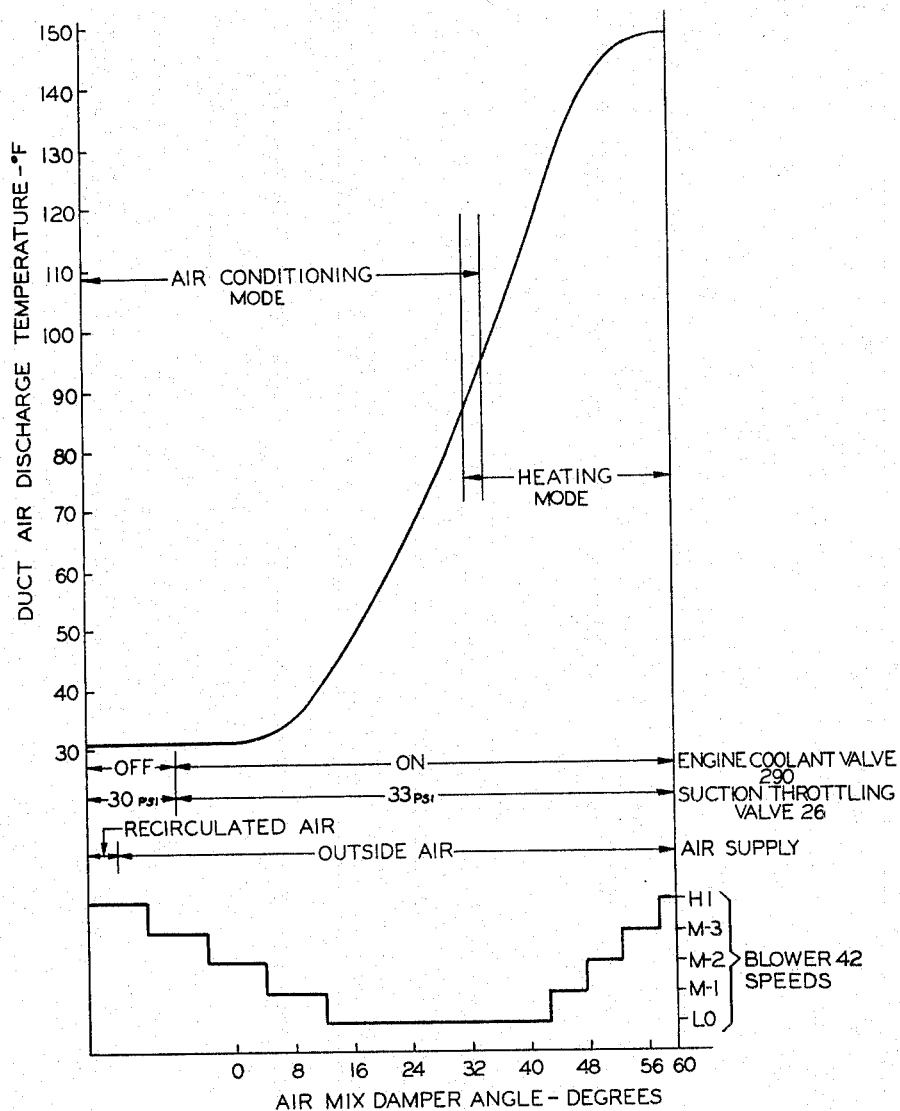

FIGURE 9 is a diagrammatic view showing the vacuum control components of the system and also the electrically actuated portions all of which are arranged for an integrated cooperation whereby desired programming may be achieved despite a wide diversity of conditions to be encountered; and FIGURE 10 presents a diagram showing the duct temperature and blower program as a function of the angular position of an air-mix damper.

The system herein disclosed utilizes vacuum motors to actuate certain components. Such motors are described in the United States Patent No. 2,963,954, granted December 13, 1960, in the name of A. D. Baker. A servo-valve vacuum controlled air-mix damper is described in the United States patent application Serial No. 236,559, filed November 9, 1962, in the name of G. L. Rodgers and now abandoned. Suitable amplifier circuits which are condition responsive and taken by themselves are shown to be old in the United States Patent to B. H. Pinckaers No. 2,945,133, granted July 12, 1960, and also in the United States patent to J. W. Gray, No. 2,622,231, granted December 16, 1952. Transducers for receiving a signal in the form of a varying electrical current and effecting a corresponding movement in a control unit such as a valve are known and a specific version thereof is described in the United States Application for Letters Patent Serial No. 159,861, filed December 18, 1961, now Patent No. 3,172,021 in the name of M. J. Manahan, and also in the United States Patent No. 3,073,345, granted January 15, 1963, in the name of N. R. Hagler. A suction throttling valve is disclosed in the United States Patent No. 3,084,521, granted April 9, 1963, in the name of E. S. Schlotterbeck and entitled, "Control for Refrigerating System." A thermal vacuum valve is described in the United States Patent No. 1,871,733, granted August 16, 1932, in the name of E. G. Petersen and entitled, "Engine-Shutter Apparatus." Components or separate devices such as the above are utilized in the system herein disclosed but they are not herein fully described as their specific forms may be varied and are not necessary in the setting forth of the present invention.

Figure 1:
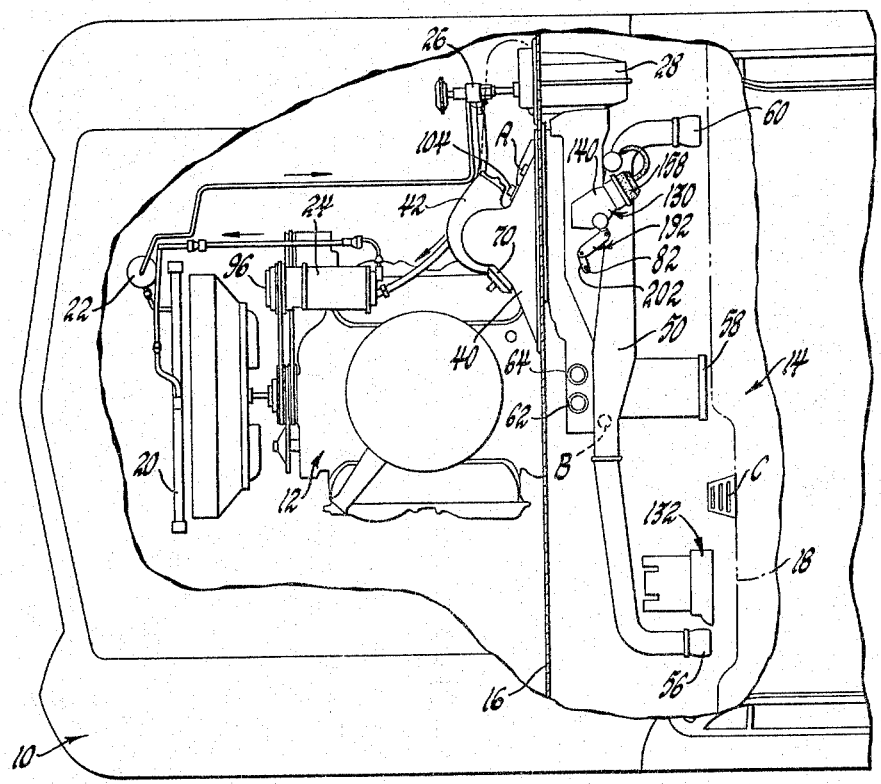
FIGURE 1 is an elevation view of the front half of an automobile with portions broken away to show the general layout of the system of the present invention as installed.
Figure 7:
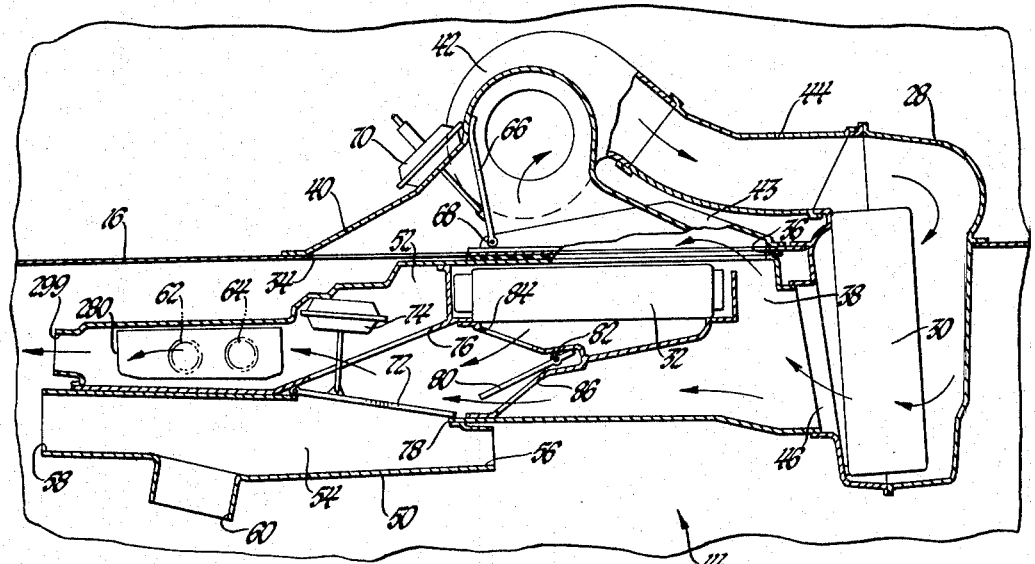
FIGURE 7 is a sectional view of the duct work and damper arrangement used in the system of FIGURE 1 with parts broken away and arrows to show the air paths for car heating and windshield defrosting.
Figure 8:
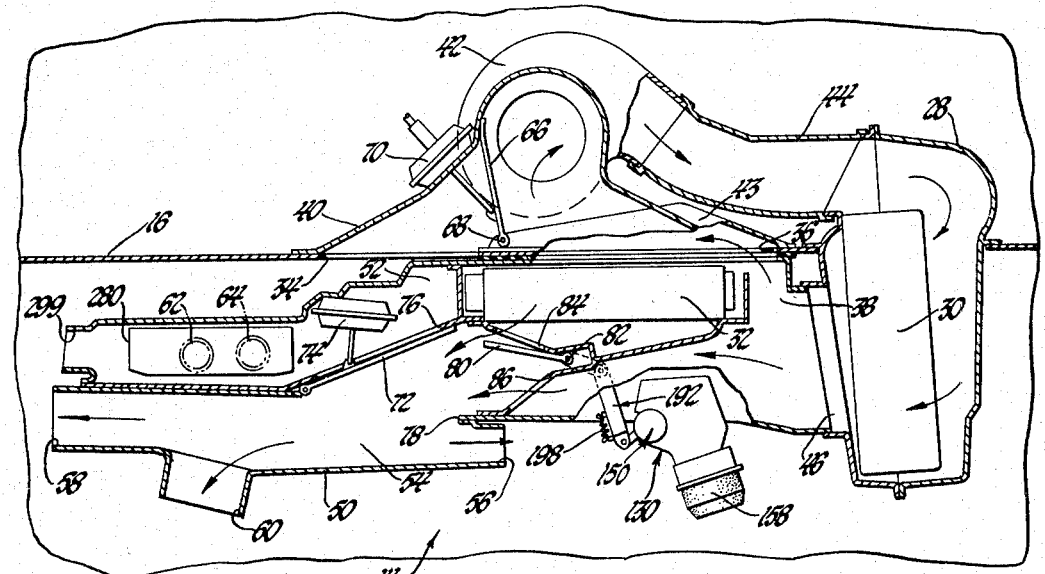
FIGURE 8 is a view similar to that of FIGURE 7 but showing, by means of arrows, the paths of air devised whereby air conditioning or passenger compartment cooling is achieved.

In FIGURE 1, an automotive vehicle 10 is depicted having an engine 12 separated from a passenger compartment 14 by means of a firewall 16. The rear edge of an instrument panel or dash is shown by dot and dash lines at 18. Components of an air conditioning system are shown to include common items such as a condenser 20, a dehydrator 22, a compressor 24, a suction throttling valve 26 and an evaporator 28. The latter includes an evaporator core 30 (FIGURES 7 and 8). A heater core 32 is shown at the rear side of the firewall 16 and the latter bears openings 34 and 36. The opening 34 leads directly to the passenger compartment for receiving recirculation air whereas the opening 36 is sufficiently large not only to serve for air admission to the heater core 32 but to provide added space at one side of the core 32 for air to pass forwardly in a zone 38 before going rearwardly and through the core 32.

Referring again to FIGURE 1, the forward side of the firewall is fitted with an outside air receiving housing 40. This housing is above the openings 34 and 36 and is adapted to receive outside air from a grille (not shown) located in front of the windshield. The initial receiving of the outside air is much like that disclosed in the United States Patent No. 2,963,954, heretofore mentioned except that the axis of a blower 42 is now made vertical instead of being inclined as in the patent. The blower 42 is arranged to receive air from the housing 40 and force it downwardly in front of a cover 43 and then horizontally through a duct 44 to the casing of the evaporator 28. The casing has an opening 46 communicating with one end of an air distributor duct work 50 supported at the rear of the firewall 16 and enclosing the heater core 32, the zone 38 which leads to the inside of the cover 43, a defroster air channel 52 and a ventilation or cooled air channel 54. The channel 54 has three outlets 56, 58 and 60 each individually controlled by a valve or damper which is not shown. The lower ends of conduits leading to the inside surface of the windshield for defrosting purposes are shown by dot and dash circles at 62 and 64. A damper 66 is pivoted at 68 for operation by a vacuum motor 70 whereby either outside air (from the grille previously mentioned) or recirculated air (air from the passenger compartment 14) may be directed to the inlet of the blower 42. A similar damper 72 and a vacuum motor 74 are arranged to control openings 76 and 78 leading to the channels 52 and 54 respectively. An air-mix damper 80 is pivotally mounted at 82 to control two openings 84 and 86 leading into the zone 54 from the heater core 32 and directly from the opening 46 respectively.

In FIGURE 9, diagrammatic views of a switch arrangement 90 and a circuit board 92 are shown for serving the motor 94. The latter is provided for controlling the blower 42 (FIGURE 1). A clutch is represented at 96 through which the compressor 24 may be actuated by the engine 12 and as controlled by a compressor ambient switch 98 and a "time delay" switch 104. A resistor 100 is in series with the blower motor 94 and provides a second level of blower speeds. Speed is manually selected as will be described hereinafter. A battery is depicted at 102 and it is connected to the switch arrangement 90 and the circuit board 92 through the "time delay" switch 104. The time delay is not due to the switch but to a valve 282 as will appear. An amplifier 106 is arranged to receive current from the battery 102 and is connected by lines 108, 110 and 112 to the switch arrangement 90, a transducer 114, and a temperature sensor system 116 respectively. The sensor system includes an outside or ambient air temperature thermistor A in housing 40, a duct outlet temperature thermistor B in zone 54, and an in-car temperature thermistor C located on the dash where it also senses sun load (FIGURE 1). The sensors are connected in series and change resistance in inverse proportion to a temperature change. The total sensing resistance influences the amplifier 106 which in turn causes the transducer 114 to perform its function. The transducer 114 receives a voltage input from the amplifier 106 and regulates a vacuum in a conduit 120 so that the vacuum is inversely proportional to the voltage input. The vacuum supply is a tank 122 which in turn is connected by a fitting 124 to the intake manifold 126 of the engine 12. A check valve 128 is provided to insure that the vacuum in the tank 122 is maintained.

Much of which is described above insofar as individual details are concerned has been used before although the arrangement as a cooperative whole is new. The present invention is primarily concerned with an all weather air-mix reheat system as heretofore stated and as such it provides a novel combination of major components including with the air-mix damper 80, a power assembly generally indicated at 130, a dash control assembly generally indicated at 132, and auxiliary components such as switches, other dampers, also valves, linkages and vacuum lines and motors.

In this new system, the primary control function is to position the air-mix damper 80 thereby achieving the required distributor duct work 50 outlet temperatures as sensed by the thermistor B. Secondary control functions include the selection of air cooling or heating, use of mere ventilation, the addition of recirculated air, regulation of blower speed, etc.

Figure 2:
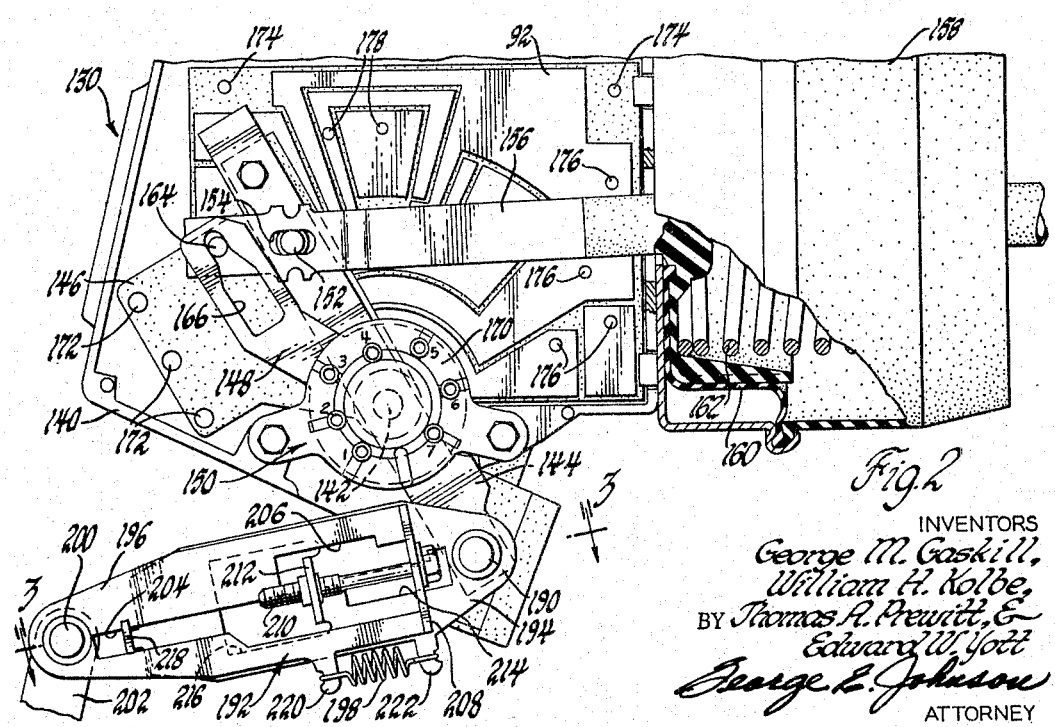
FIGURE 2 is an elevation view, drawn to an enlarged scale, of a power assembly by means of which the programming is accomplished in response to condition sensors in the operation of the system.

One of the major components, as stated, is the power assembly 130 for positioning the air-mix damper 80 and this assembly is concealed under the dash and is mounted on the distributor duct work 50. It comprises a box 140 in which are pivoted about an axis 142 the intermediate portion of a lever 144, an insulator (nylon) contactor plate 146 and a vacuum valve arm 148 for actuating a rotary vacuum valve 150. The lever 144 bears a pin 152 which engages a slot 154 of a plunger 156. The latter has one end fixed to a flexible diaphragm 160 in a vacuum motor 158 to move with it. A spring 162 constantly urges the diaphragm 160 and plunger 156 against the action of a vacuum placed on the motor. The plunger 156 also bears a pin 164 engaged in a slot 166 of the valve arm 148. A stationary plate 170 of the vacuum valve bears nipples which are numbered 1 to 7. Contactor means (not shown in FIGURE 2) are riveted as at 172 to the pivoted insulator plate 146 so that such means resiliently engage the circuit board 92 anchored at 174 to the inside bottom surface of the box 140. Terminals are indicated at 176. A number of points such as at 178 are connections to suitable resistors such as the four resistors 180, 182, 184 and 186 of FIGURE 9.

One end of the lever 144 extends from the box 140 and is pivoted at 190 to one end of a two-plate link 192. This link includes a lower plate 194 and an upper plate 196 which plates are relatively slidable against the loading of a tension spring 198. The other end of the link 192 is pivoted at 200 to an arm 202 for operating the air-mix damper 80. The upper plate 196 has a slot with a narrow portion 204 and a wide portion 206. The wide slot portion terminates at a vertical flange 208 which is apertured slidably to receive the smooth portion of a bolt 210 and to act as a stop determining the shortest length of the link 192 due to action of the spring 198. The threaded end of the bolt 210 is locked to a flange 212 of the lower plate 194. The flange 212 extends upwardly through the slot portion 206, and permits extension of the length of the link 192 against tension of the spring 198. The lower plate 194 has two slots—a narrow slot 214 and a wide slot 216. The narrow slot 214 serves as a guide for a tab 218 extending down from the flange 208. The wide slot 216 is merely for material in forming the flange 212. The narrow slot 204 in the upper plate 196 serves as a guide for a tab 218 extending upwardly from the lower plate 194. A horizontal tab 220 or 222 extends from each of the plates and the spring 198 connects the two tabs.

The dash control assembly 132 includes a dial 230 bearing a horizontal slot 232 from which the end knob of a manual control or selector lever 234 protrudes. Placement of the lever 234 (FIGURE 4) under either of the two arrow heads beneath the legend "Automatic" determines the high or low level of speeds for the blower motor. The dial also has a vertical slot 236 arranged partially to reveal a graduated adjustment wheel 238 for setting the temperature desired in the passenger compartment 14. This wheel is arranged to operate a rheostat 240 connecting the line 112 (FIGURE 9) to ground. A horizontal plate 242 is connected to the dash and serves as a support for a fixed and nippled vacuum valve plate 244. The latter is part of a rotary valve generally indicated at 246. The nipples are marked with numbers 1, 2, 3, 4 and 5 (FIGURE 6). A top plate 248 of the valve 246 carries a vertical pin 249 the top end of which is arranged to slide in a cam groove 250 formed in the underside of the lever 234. The latter is pivotally mounted as at 252 on the plate 242. Pivoting of the lever 234 serves to rotate the top valve plate 248 and connect the proper ports or nipples in the valve 246 to components of the system shown in FIGURE 9 thereby to effect the programming. The underside of the lever 234 also includes a cam groove 250 in which a pin 252 is adapted to move. This pin is fixed to one end of a bell crank lever 254 which is pivoted at 256 to a bracket 258. The latter is fixed to the plate 242 and serves to support the switch arrangement 90 for operation by the bell crank lever. A cam plate 260 has one arm 262 extending above the vacuum valve 246 and the manual lever 234. The plate 260 is pivoted on a pin 261. This arm bears a downwardly facing cam groove 264 in which a pin 266 is adapted to move and the latter is fixed to the lever 234. Another arm 268 of the plate 260 carries a pin 270 to which one end of a Bowden wire 272 is fastened. One end of a guiding conduit or sheath 274 for the wire 272 is held by a clip 276 fixed to the plate 242. It will be understood that the wire 272 is connected to a windshield defroster damper 280 such as diagramatically shown in FIGURES 7 and 8.

With the lever 234 at "OFF" the motor 70 closes the outside damper 66, opens the switch 104, and the whole system is closed down. The programming is such that if the lever is beneath the left arrowhead under "Automatic" in FIGURE 4, normal air conditioning and heating will take place to satisfy the setting of the wheel 238. If at the right-hand arrowhead beneath "Automatic" then the system takes care of extreme conditions of heating and/or cooling. If at "Defrost" the controls, including the cams of the unit 132 (see FIGURE 5), suitably modify the system operation.

Returning to FIGURE 9, a number of system components are therein illustrated. They include a thermal vacuum valve 282, a check valve 284, a neutral safety switch 286, an emergency vehicle brake release diaphragm motor 288, a "time delay" switch 104 as operated by the vacuum diaphragm motor 70 controlling the damper 66, an engine fast idle diaphragm motor 289, the suction throttling valve 26 for the refrigerant outlet of the evaporator core 30, and a heater engine coolant shut-off valve 290. The vacuum motor 74 for controlling the damper 72 is illustrated and is a primary control element as its operation determines from which discharge ducts the conditioned air will be delivered. The blower switch 104 as well as the thermal vacuum valve 282 is shown twice in FIGURE 9 merely to aid in illustrating the operation.

When the engine fast idle diaphragm motor 289 detects a low vacuum condition from the operation of the neutral safety switch 286 in conjunction with the power unit 130, specifically port 6, it functions to increase the engine speed. It is needed when air conditioning is required. It is not needed during the heating mode of operation of the system.

The thermal vacuum valve 282 is temperature sensitive and is such as to sense the engine coolant temperature. A calibrated bimetal disk is selected as a suitable thermal motor and active part of the valve. When the valve has been below 70° F. and not over 100° F., the port is sealed. These temperature are nominal and can have large variations in actual practice. When the valve temperature increases over 100°, the valve will open causing a path for air to flow thus evacuating the motor 70 by way of the conduit 300 and the nipples 2 and 1 of the vacuum motor 246. It will also supply vacuum to the nipple 2 of the vacuum motor 150. As the valve cools off and goes below about 70° F., no air will flow. It will be noted that the vacuum valve 150 has two vacuum input nipples 2 and 1. Input nipple 2 is connected to the valve 282 as stated and when the engine becomes warm enough, the damper 66 will move to admit outside air and the "time delay" switch 104 will be closed. If the engine is started after a cold soak, the blower 42 is held "off" until the outside air damper 66 opens the passage in the housing 40 leading from the grille by vacuum as supplied by the valve 282. However, the passage for admitting outside air is not cleared immediately by the damper because of a time delay built into the system. When the engine is first started, the power assembly motor 158 is immediately actuated and rotates the lever 144 into the proper position for the heating portion of the control program. The lines or conduits supplying vacuum to all other major vacuum motors are restricted to provide enough time delay for the control assembly to reach heater position without the grille passage being opened. Only when the engine temperature is warm enough as detected by the valve 282 is vacuum supplied to the vacuum motor 70. This opens the system to outside air and turns the blower 42 "on" to introduce heated air into the compartment 14 as indicated by the flow arrows in FIGURE 7. Meanwhile, the air-mix damper 80 is positioned for maximum heat and the car interior warms at the highest possible rate. When the temperature at 14 nears the preset temperature determined by the position of the wheel 238, the discharge air temperature from the air-mix damper 80 will begin to drop and eventually will be balanced between the setting and the existing ambient conditions. The speeds of the blower 42 will simultaneously also be suitably controlled.

In hot weather the operation is as follows: the power assembly 130 is normally in the maximum cold position and, therefore, there is only a short time delay caused by the restricted vacuum lines holding the outside air damper 66 closed as to the grille passage of housing 40 and the blower 42 "off." After that delay, which is but a few seconds, the opening 34 will be open and the blower will be "on" sending recirculated air into the car. No heat from the core 32 will be imparted to the air as the damper 80 will be positively closing the opening 84 due to the loading of the spring 198 in the link 192. The clutch 96 will be operative and cooling of the car interior will be undertaken. Cooling tapers off as the interior temperature approaches the preset temperature with a change from recirculated air use (opening 34) to outside air use (grille passage), from high blower speed to a lower speed, from 30 p.s.i.g. to 33 p.s.i.g. suction throttling valve 26 operation, from the lower blower speed to a still lower speed, and then to the beginning of the opening of the air-mix damper 80 with respect to the opening 84 to modulate the cooled air with heated air. The heating is accompanied by a dehumidifying action of the evaporator core 30. Operation is automatic and no driver attention is ordinarily required. However, a multi-position switch arrangement may be used to cause the blower 42 to operate at a higher speed if additional air is desired. Shifting of the lever 234 to the extreme right end of the slot 232 (FIGURE 4) rotates the arm 260 clockwise about the pin 261 (FIGURE 5) and pushes the wire 272 to open the damper 280. This effects clearing of the windshield of fog, ice or snow.

After steady conditions are attained in any particular situation, small changes in ambient conditions are detected by the appropriate sensors and balancing or corrective steps are the automatic result.

When maximum cooling is desired, the air-mix damper 80 is assured of positively closing the opening 84 as set forth above because, after the damper 80 seats to close the opening 84, further movement of the control lever 144 to its extreme counterclockwise position (FIGURE 2) merely increases the loading of the spring 198 as the link 192 lengthens: this override of the control assembly permits the simultaneous changing of blower speeds, evaporator pressure and recirculation air use. The lever 144 travels 60° and only a 45° range of the 60° angle is used to control the air-mix damper 80 within the full-on to full-off range of the air treatment program of the system.

The air-mix damper 80 controls the amount of air which is bypassed around the heater core 32. The position of this damper therefore determines the duct work air discharge temperature. When the heater discharge temperature is above 90° F., the air is distributed through the zone in the duct work below the defroster damper 280 (FIGURE 7) to flow outlets (not shown) as well as to the outlet 299. When the temperature of the air discharged from the duct work is less than 90° F., it is distributed through the dash outlets 56, 58 and 60. This distribution selection is performed automatically in power operation of the appropriate dampers in accordance with the predetermined programming.

From the above description, the operation of the system is clear but it may be noted that the predominant aspects of the system reside in the air-mix damper for controlling temperature with a controlled vacuum power assembly linked as a driver element for the air-mix damper and as an automatic control of auxiliary system components, the damper and power assembly being in combination with a dash assembly for manually selecting or presetting the conditions to be attained by the system. Since the air distribution and velocity functions of the system are tied to the temperature of the duct temperature, those functions are regulated by the positions of the air-mix valve 80. As an illustration, when maximum air conditioning or cooling is desired, the coldest air available at maximum air flow is desired out of the air conditioning outlets 56, 58 and 60. These outlets are fitted with conduits (not shown) to discharge into the passenger compartment at the level of the panel 18. With maximum heating the warmest air available at high or highest velocity is desired from the zone 52. Between these two extreme lower air flows and duct temperatures closer to body temperature is desired. Therefore, the air-mix damper position will designate the source of air, its velocity and the air outlet position. Also, the position of the damper 80 determines whether the system comes on immediately for cooling or is delayed for heating if necessary.

Since the heater core 32 and evaporator core 30 are operating at maximum capacity the resulting duct temperature is practically independent of engine speed. Only at engine idle is there any variation in the system operation and here it is not noticeable for when the heater capacity falls off the evaporator capacity falls off and as a result there is very little change in duct temperature. This contributes to the air-mix automatic control reheat system simplicity. One position of the knob on the manually adjustable lever 234 results in one duct temperature under all driving conditions.

We claim:

1. An automotive comfort control system comprising a heater core, an evaporator core, duct work and dampers for selectively conducting air through said cores in series and solely through said evaporator core, one of said dampers being an air-mix damper for proportioning the air flow from said evaporator core through and around said heater core, a power control assembly linked to said air-mix damper to operate the latter, multiple control elements in said power assembly and operatively connected to control components of said system other than said air-mix damper, sensor means for detecting temperature conditions encountered by said system, a vacuum supply, vacuum control means influenced by said sensor means to vary the degree of vacuum available from said vacuum supply to gain a controlled vacuum, means for operating said power control assembly in accordance with said controlled vacuum, and a dash control assembly remote from said power control assembly but operatively connected to the latter and said various components of the system whereby an overriding manual control of a predetermined setting of the system may be effected.

2. An automotive comfort control system comprising a heater, an evaporator, duct work and dampers for guiding air through said evaporator and heater in series for maximum heating and solely through said evaporator for maximum cooling, one of said dampers being an air-mix damper for proportioning the air flow from said evaporator through and around said heater, a control assembly operatively linked to said air-mix damper, elements in said power assembly operatively connected to components of said system including a vacuum supply, vacuum motors, a blower motor, temperature sensors, a suction throttling valve associated with said evaporator, and an engine coolant shut-off valve to the said heater, vacuum control means including said sensors, an amplifier and a transducer to gain a controlled vacuum from said vacuum supply, means for operating said control assembly in accordance with said controlled vacuum, and a dash control operatively connected to said control assembly operating means whereby a setting of the system may be adjusted.

3. An automotive comfort control system comprising a heater core, an evaporator core, means for directing air through said cores, an air-mix damper for proportioning the flow of air from said evaporator core through and around said heater core, other control means for said system, a power assembly operatively connected to said air-mix damper and said other control means of said system, and a dash control assembly operatively connected to said power assembly for overriding a predetermined setting of the system.

4. An automotive comfort control system comprising a heater core, an evaporator core, means for conducting air through said cores, an air-mix damper arrangement for proportioning the flow of air from said evaporator core through said heater core and around the latter, other control means for said system, a vacuum source, a vacuum power assembly operatively linked to said air-mix damper and said other control means, temperature sensing means capable of giving a signal as to conditions obtaining, a transducer for receiving said signal and obtaining a controlled vacuum from said vacuum source, and said vacuum power assembly being connected to said transducer for operation by said controlled vacuum.

5. An automotive comfort control system as set forth in claim 4, said vacuum power assembly being linked to said air-mix damper by a link assuring positive seating of the air-mix damper in one operative position of the latter.

6. An automotive comfort control system as set forth in claim 4 in which a dash control supplements the vacuum power assembly in controlling the system, and said dash control and vacuum power assembly each includes a rotary vacuum valve for controlling the vacuum supplied by said vacuum source to actuate said other control means.

7. An automotive comfort control system as set forth in claim 4, said temperature sensing means including an outside air temperature sensor, an inside car temperature sensor, and a system air discharge sensor.

8. An automotive comfort control system as set forth in claim 4, said vacuum power assembly including a circuit board and switch arrangement, a blower arranged upstream from said evaporator, and said blower having a multi-speed motor controlled by said circuit board and switch arrangement.

9. An automotive comfort control system as set forth in claim 4 in which a dash control supplements the vacuum power assembly in controlling the system, and said dash control including a rheostat whereby said signal may be adjusted.

10. An automotive comfort control system as set forth in claim 4, said vacuum power assembly including a circuit board and switch arrangement, and said means for conducting air through said cores including a blower.

11. An automotive comfort control system as set forth in claim 3 which includes a temperature sensing means having an outside air temperature sensor, an inside car temperature sensor, a system air temperature sensor and a variable impedance temperature selecting means so arranged to cooperatively develop an electrical signal quantity, the temperature selecting means being operatively connected to the dash-control assembly, and means responsive to said electrical signal quantity for operating said power assembly so as to maintain the desired inside car temperature.

12. An automotive comfort control system as set forth in claim 11 wherein said sensors include serially connected temperature sensing thermistors and said temperature selecting means includes a manually variable resistor serially connected to said temperature sensing thermistors, the variable resistor and series connected thermistors being connected together in series and across an electrical energy source so as to cause the electrical signal quantity to be developed at the junction therebetween.

References Cited by the Examiner
UNITED STATES PATENTS

| | | | |
|---|---|---|---|
| 3,003,320 | 10/1961 | Obermaier | 165—16 |
| 3,122,202 | 2/1964 | Scharres | 165—36 |

ROBERT A. O'LEARY, *Primary Examiner.*

CHARLES SUKALO, *Examiner.*